(12) United States Patent
Lin et al.

(10) Patent No.: US 7,181,232 B2
(45) Date of Patent: Feb. 20, 2007

(54) INTERFERENCE-RESISTANT WIRELESS AUDIO SYSTEM AND THE METHOD THEREOF

(75) Inventors: Wen-Sheng Lin, Hsin-Chu (TW); Cheng-Ming Liang, Hsin-Chu (TW); Yi-Hsiu Huang, Tainan Hsien (TW); Lin-Tien Mei, Hsin-Chu Hsien (TW); Jui-Jung Huang, Hsin-Chu Hsien (TW); Chih-Sheng Chou, Taoyuan County (TW)

(73) Assignee: Syncomm Technology Corp., Hsin-Chu (TW)

( * ) Notice: Subject to any disclaimer, the term of this patent is extended or adjusted under 35 U.S.C. 154(b) by 132 days.

(21) Appl. No.: 10/907,380
(22) Filed: Mar. 31, 2005

(65) Prior Publication Data

US 2006/0121931 A1  Jun. 8, 2006

(30) Foreign Application Priority Data

Dec. 7, 2004  (TW) ............................. 93137813 A

(51) Int. Cl.
*H04Q 7/20* (2006.01)
(52) U.S. Cl. .................. 455/480; 455/41.2; 455/63.1; 455/63.3; 455/509
(58) Field of Classification Search ............ 455/550.1, 455/95, 41.2, 450, 455, 456.6, 464, 509, 455/5.5, 63.1, 63.3, 67.11, 67.13, 560, 101, 455/103, 114.2, 115.1; 375/259; 320/338, 320/347
See application file for complete search history.

(56) References Cited

U.S. PATENT DOCUMENTS

| 2002/0061744 A1* | 5/2002 | Hamalainen et al. ........ 455/426 |
| 2003/0152055 A1* | 8/2003 | Aragones et al. ........... 370/338 |
| 2004/0132500 A1* | 7/2004 | Rogalski et al. ......... 455/569.1 |
| 2004/0223553 A1* | 11/2004 | Kumar ....................... 375/259 |
| 2006/0084384 A1* | 4/2006 | Kiemunki .................. 455/41.3 |
| 2006/0194538 A1* | 8/2006 | Palin et al. ................ 455/41.2 |
| 2006/0205401 A1* | 9/2006 | Palin et al. ................. 455/425 |

* cited by examiner

*Primary Examiner*—Pablo N. Tran
(74) *Attorney, Agent, or Firm*—Winston Hsu

(57) ABSTRACT

An interference-resistant wireless audio system includes a transceiver for transforming an audio signal into an RF signal, and a receiver for receiving RF signals in the air. The transceiver has an audio signal receiver, an audio data format converter, a frame and coding unit, a modulation module, an RF transceiver, a receiving/transmitting switch controller, an RF signal detector, and a channel switch controller electrically connected to the RF signal detector for controlling the RF transceiver to switch the used channel to another one after receiving a switch signal generated by the RF signal detector.

22 Claims, 7 Drawing Sheets

| Channel | Channel center frequency |
|---|---|
| 1 | 2412MHz |
| 2 | 2417MHz |
| 3 | 2422MHz |
| 4 | 2427MHz |
| 5 | 2432MHz |
| 6 | 2437MHz |
| 7 | 2442MHz |
| 8 | 2447MHz |
| 9 | 2452MHz |
| 10 | 2457MHz |
| 11 | 2462MHz |
| 12 | 2467MHz |
| 13 | 2472MHz |

Fig.7

INTERFERENCE-RESISTANT WIRELESS AUDIO SYSTEM AND THE METHOD THEREOF

BACKGROUND OF INVENTION

1. Field of the Invention

The present invention relates to a wireless audio system, and more particularly, to an interference-resistant wireless audio system and related method.

2. Description of the Prior Art

In recent years, due to the progressive development of wireless communications technology, a variety of electronic device comprising a wireless communication module can wirelessly transmit and receive audio signals and data signals.

Please refer to FIG. 1, which is a functional block diagram of a wireless audio system 10 according to the prior art. The wireless audio system 10 comprises a transmitter 12 for transforming an analog audio signal into an RF signal and for transmitting the RF signal into the air, and a receiver 14 for receiving the RF signal in the air and for transforming the received RF signal into a corresponding analog audio signal. Therefore, a user can hear the analog audio signal from the receiver 14.

The transmitter 12 comprises an audio signal receiver 16, an audio data format converter 18, a frame & coding unit 20, a modulation module 22, and an RF transmitter 24.

The audio signal receiver 16, along with the audio data format converter 18, sample the analog audio signals and a plurality of digitized sampling data points are acquired, each of which corresponds to an amplitude and phase of the analog audio signal at a predetermined sampling rate. Then the sampling data points are transformed into a digital signal $P_1$ formatted for the pulse-code modulation (PCM). Thereafter, the frame & coding unit 20 appends a header and a tail serving as an error protection code to the digital signal $P_1$, and generates a bit-streamed frame signal $P_2$, which will be transmitted to the modulation module 22 bit by bit. The modulation module 22 modulates the bit-streamed frame signal $P_2$ into an analog base-band signal $P_3$ suit for wireless communications. Subsequently, the RF transmitter 24 up-converts the analog base-band signal $P_3$ into an RF signal $P_4$, and wirelessly transmits the RF signal $P_4$ into the air.

The receiver 14 comprises an RF receiver 26, a demodulation module 28, a frame synchronization controller 30, a digital-to analog converter (DAC) 32, and a detachable speaker 34.

After receiving the RF signal $P_4$ transmitted by the transmitter 12, the RF receiver 26 down-converts the RF signal $P_4$ into a base-band signal $P_5$, which corresponds to the base-band signal $P_3$. The demodulation module 28 then demodulates the base-band signal $P_5$ into a bit-streamed frame signal $P_6$ corresponding to the frame signal P2 which is suit for digitally serial transmission. The frame synchronization controller 30 parses the header and the tail appended to the frame signal $P_6$, and identifies the correctness to acquire a digital audio signal $P_7$. After the DAC 32 transforms the digital audio signal $P_7$ into an analog audio signal, the speaker 34 plays the analog audio signal transformed by the DAC 32.

Ideally, the analog audio signal played by the speaker 34 should be the same as that inputted into the audio signal receiver 16. Besides, all wireless communication devices usually use the unlicensed band, such as 2.4 G ISM band or 5 G ISM band, which are defined by the wireless legislation of Governments. For example, FCC in US or CE in Europe.

Please refer to FIG. 7 and FIG. 2. FIG. 7 lists a plurality of channels and their corresponding channel center frequencies in WLAN 802.11b and 802.11g standard. FIG. 2 is a frequency spectrum of the channels in WLAN 802.11b and 802.11g standard. As FIG. 2 shows, each of the channels occupies a bandwidth as wide as 22 MHz, while the difference between any two neighboring channel is as narrow as 5 MHz only. Thus, two RF signals respectively transmitted by the wireless communication devices will interfere with each other if the interval of the channels are not wider than four channels.

When a channel used by a wireless communication device is overlapped by another one, the RF signals transmitted by the wireless communication device are interferenced. Therefore, the severely distorted analog audio signals are generated, and the speaker 34 will mute in order not to output unendurable noises. Sometimes, the interference problem is so severe that a wireless communications link between the transmitter 12 and the receiver 14 is severely impacted or even failed.

When the distortion, the noises, or the fail of the wireless communication link resulted from the interference problem occur, the wireless audio system 10 executes the mute process to control the speaker 34 not to play the probably contaminated analog audio signal until the interference problem is gone. However, if the speaker 34 is playing music, the mute process will interrupt the music and spoils the mood of a user to enjoy the music.

In addition to the mute process, the wireless audio system 10 can get rid of the interference problem by switching the interferenced channel manually. However, the switching process is inconvenienced for the user because he has to switch the channel manually as hearing the noise.

SUMMARY OF INVENTION

It is therefore a primary objective of the claimed invention to provide an interference-resistant wireless audio system and the method thereof, which has a capability to detect any errors resulted from the interference, and to switch the used channel to another one to output audio signals as clear as possible.

A secondary objective of the claimed invention is to provide an interference-resistant wireless audio system and the method thereof, which has a capability to detect the frequency of an RF signal in the air. Besides, the used channel will be stitched to another one as long as another RF signals, the channel of which overlaps that being used previously are detected. Thus the interference problem can be diminished.

In order to accomplish the primitive objectives, the present invention provides an interference-resistant wireless audio system having a transmitter for transforming an audio signal into an RF signal, and a receiver. The transmitter includes an audio signal receiver for receiving an audio signal, an audio data format converter electrically connected to the audio signal receiver for transforming the audio signal into a digital signal formatted for the pulse-code modulation (PCM), a frame & coding unit electrically connected to the audio data format converter for appending an encoding data to the digital signal, a modulation module electrically connected to the frame & coding unit for transforming the digital signal with the encoding data into an analog base-band signal, an RF transmitter electrically connected to the modulation module for up-converting the analog base-band signal into the RF signal, and transmitting the RF signal into the air, a control signal receiver for receiving a control signal in the air, and a channel switch controller electrically connected to the RF transmitter and to the control signal receiver for controlling the RF transmitter to switch the used channel to another one when the control signal is received by the control signal receiver. The receiver includes an RF receiver for receiving the RF signal, and for down-converting the received RF signal into a base-band signal, a demodulation module electrically connected to the RF receiver for demodulating the base-band signal into a bit-streamed frame signal, an error detection controller electrically connected to the demodulation module for detecting bit errors in the frame signal, and a control signal transmitter electrically connected to the error detection controller for transmitting the control signal into the air when the detected bit errors of the frame signal are not acceptable.

In order to accomplish the secondary objective, the present invention provides another interference-resistant wireless audio system having a transceiver for transforming an audio signal into an RF signal, and a receiver for receiving the RF signal in the air. The transceiver includes an audio signal receiver for receiving an audio signal, an audio data format converter electrically connected to the audio signal receiver for transforming the audio signal into a digital signal formatted for PCM, a frame & coding unit electrically connected to the audio data format converter for appending an encoding data to the digital signal, a modulation module electrically connected to the frame & coding unit for transforming the digital signal with the encoding data into an analog base-band signal, an RF transceiver for up-converting the analog base-band signal into the RF signal and transmitting the RF signal into the air when operating in a transmitting mode, and for receiving the RF signal in the air when operating in a receiving mode, a receiving/transmitting switch controller electrically connected between the modulation module and the RF transceiver, for controlling the RF transceiver to operate in the transmitting mode or in the receiving mode, an RF signal detector electrically connected to the RF transceiver for detecting the power of the RF signal received by the RF transceiver and for generating a switch signal when the power of the RF signal is stronger than a predetermined power in the receiving mode, and a channel switch controller electrically connected to the RF signal detector for controlling the RF transceiver to switch the used channel to another one after receiving the switch signal.

These and other objectives of the present invention will no doubt become obvious to those of ordinary skill in the art after reading the following detailed description of the preferred embodiment that is illustrated in the various figures and drawings.

BRIEF DESCRIPTION OF DRAWINGS

FIG. 7 lists a plurality of channels and their corresponding channel center frequencies in WLAN 802.11b and 802.11g standard.

DETAILED DESCRIPTION

Figure 1:
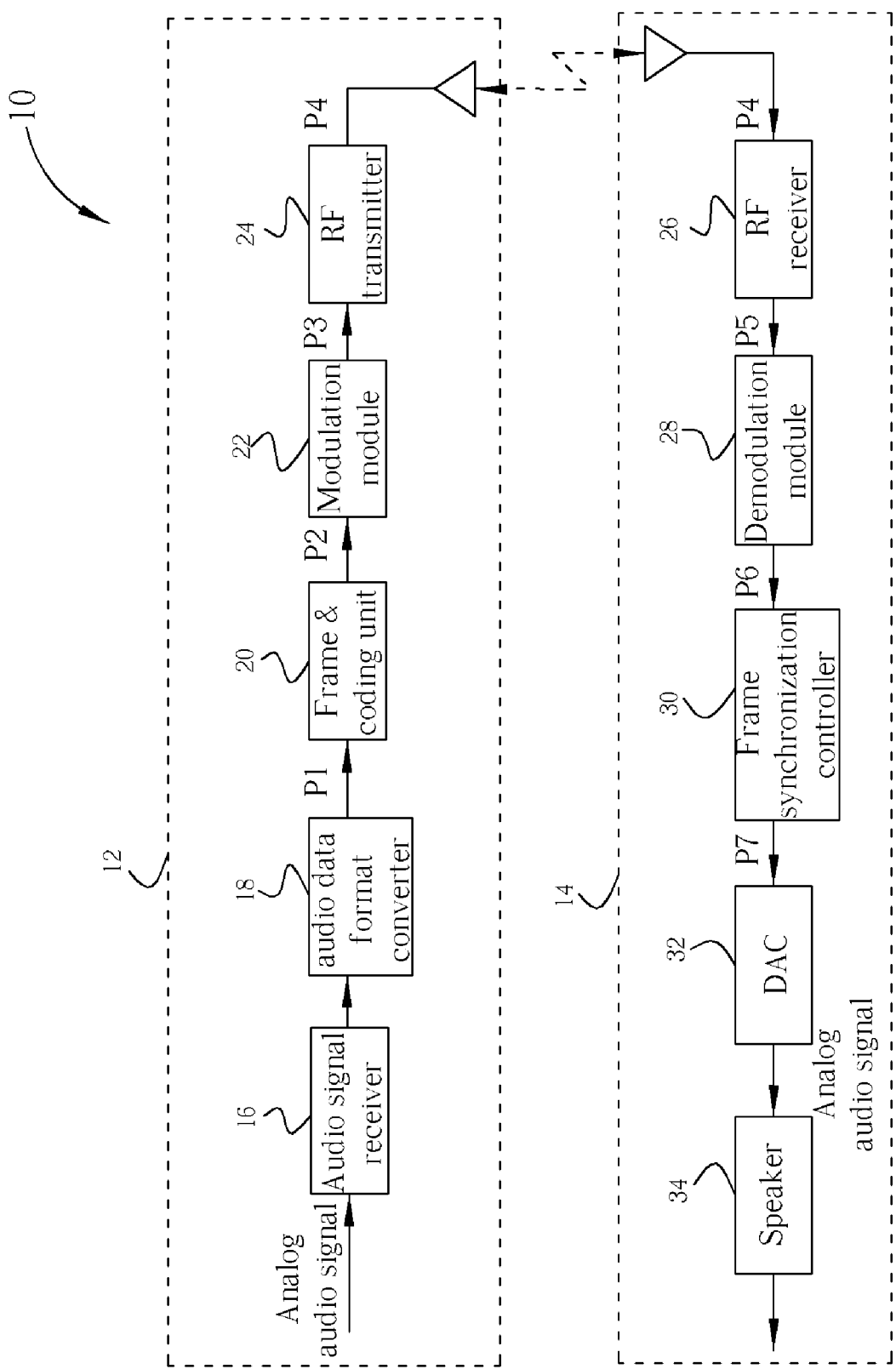
FIG. 1 is a functional block diagram of a wireless audio system according to the prior art.
Figure 2:
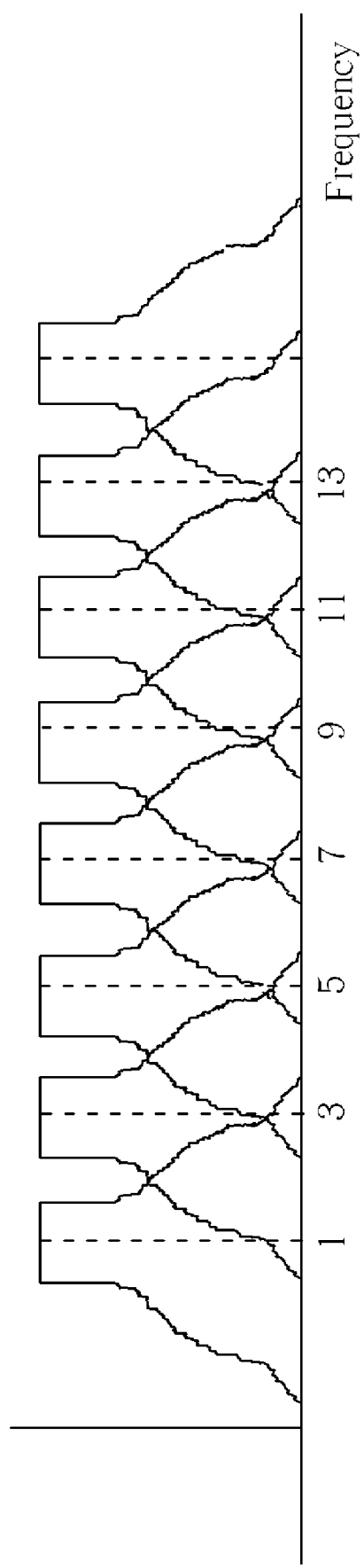
FIG. 2 is a frequency spectrum of a plurality of channels in WLAN 802.11b and 802.11g standard.
Figure 3:
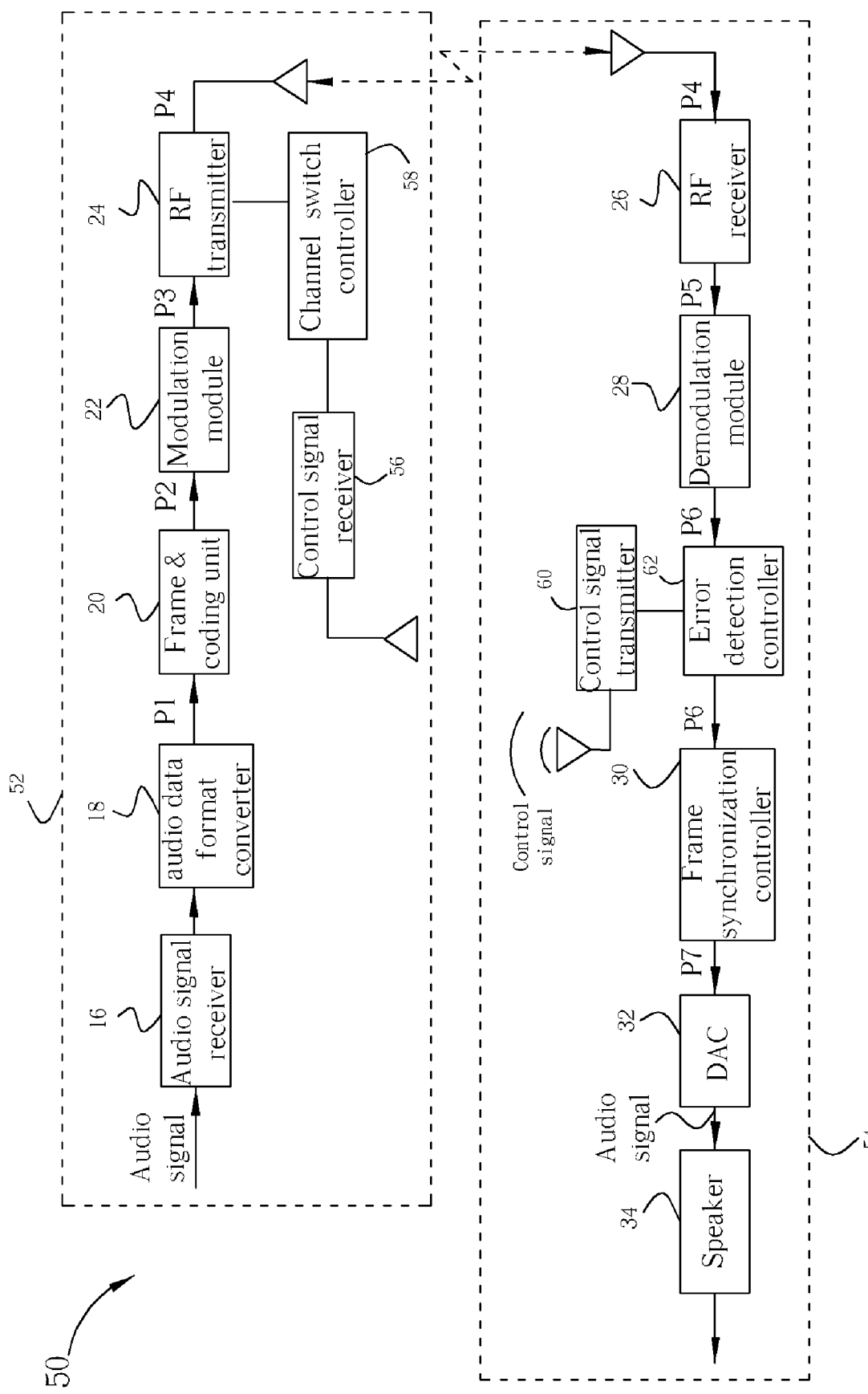
FIG. 3 is a functional block diagram of a wireless audio system of a first embodiment according to the present invention.

Please refer to FIG. 3, which is a functional block diagram of a wireless audio system 50 of a first embodiment according to the present invention. The wireless audio system 50 comprises a transmitter 52 and a receiver 54.

Besides receiving the RF signals transmitted by the transmitter 52, the receiver 54 further transmits a control signal Pc into the air if the bit errors being detected exceed a predetermined number in a period of time. After receiving the control signal Pc, the transmitter 52 switches the used channel to another one. Thus, the user doesn't have to suffer unendurable noises and switch the channel manually because the transmitter 52 has accomplished automatically.

In addition to the RF receiver 26, the demodulation module 28, the frame synchronization controller 30, the DAC 32, and the detachable speaker 34, the receiver 54 further comprises a control signal transmitter 60, and an error detection controller 62 electrically connected between the demodulation module 28, the frame synchronization controller 30, and the control signal transmitter 60. The control signal transmitter 60 is controlled by the error detection controller 62 to transmit the control signal $P_c$ into the air.

The error detection controller 62 is installed to detect errors of the frame signal $P_6$ outputted from the demodulation module 28, and determine if the bit error rate of the frame signal $P_6$ is acceptable through an error-check process by comparing the number of errors of the frame signal $P_6$ (including the header and the tail) with a predetermined bit error number during a unit of time $T_{unit}$. If the number of bit errors or frame errors are smaller than the predetermined bit error number during the unit of time $T_{unit}$, the error detection controller 62 determines that the bit error rate of the frame signal $P_6$ is acceptable, and then transmits the frame signal $P_6$ to the frame synchronization controller 30. On the contrary, if the number of the bit errors or frame errors are larger than the predetermined bit error number during the unit of time $T_{unit}$, the error detection controller 62 determines that the bit error rate of the frame signal $P_6$ is unacceptable, and therefore controls the control signal transmitter 60 to transmit the control signal $P_c$ for switching the channel into the air.

According to the first embodiment of the present invention, the error detection controller 62 can be embodied by a microprocessor. The microprocessor can be refreshed in the end of every unit of time $T_{unit}$ to recount the number of bit errors of the frame signal $P_6$.

On the other hand, in addition to the audio signal receiver 16, the audio data format converter 18, the frame & coding unit 20, the modulation module 22, and the RF transmitter 24, the transmitter 52 further comprises a control signal receiver 56, and a channel switch controller 58 electrically connected between the control signal receiver 56 and the RF transmitter 24. The channel switch controller 58 controls the RF transmitter 24 to switch the used channel to another one if the control signal $P_c$ transmitted by the receiver 54 is received by the control signal receiver 56.

Further, after receiving the control signal $P_c$ transmitted by the receiver 54, the control signal receiver 56 generates a switch signal $P_s$, and the channel switch controller 58 controls the RF transmitter 24 to switch the used channel to another one that is used for re-transmitting the RF signal P4.

As long as the control signal receiver 56 does not receive the control signal $P_c$ transmitted by the receiver 54, the RF transmitter 24 keeps transmitting the RF signal in the same channel that is used previously.

Figure 4:
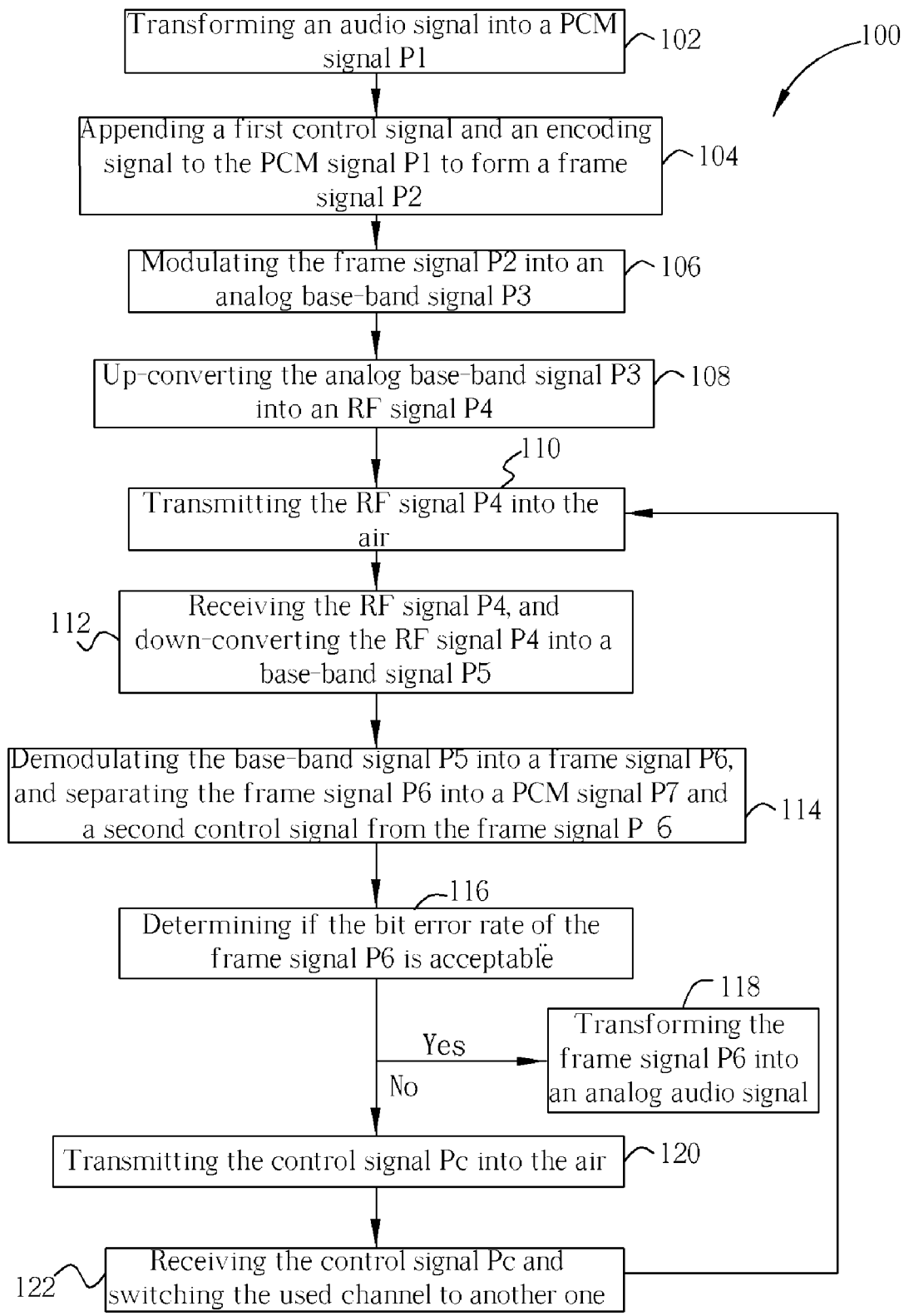
FIG. 4 is an interference-resistant method corresponding to the wireless audio system shown in FIG. 3.

Please refer to FIG. 4, which is a flow chart of an interference-resistant method 100 corresponding to the first embodiment of the present invention. The method 100 comprises the following steps:

Step 102: Transforming an audio signal into a PCM signal $P_1$;

(Step 102 is performed by the audio signal receiver 16 and the audio data format converter 18.)

Step 104: Appending a first control signal and an encoding signal (such as a cyclic redundancy check (CRC)) to the PCM signal $P_1$ to form a frame signal $P_2$;

(Step 104 is performed by the frame & coding unit 20. Besides, in step 104 a header and a tail are appended to the PCM signal $P_1$.)

Step 106: Modulating the frame signal $P_2$ into an analog base-band signal $P_3$;

(Step 106 is performed by the modulation module 22.)

Step 108: Up-converting the analog base-band signal $P_3$ into an RF signal $P_4$;

(Step 108 is performed by the RF transmitter 24.)

Step 110: Transmitting the RF signal $P_4$ into the air;

(Step 110 is performed by an antenna of the transmitter 52. Steps 102 through 110 are those of the method 100 that are performed in the transmitter 52.)

Step 112: Receiving the RF signal $P_4$, and down-converting the RF signal $P_4$ into a base-band signal $P_5$;

(Step 112 is performed by an antenna of the receiver 54 and the RF receiver 26. The following steps (including Step 112) are those of the method 100 that are performed in the receiver 54.)

Step 114: Demodulating the base-band signal $P_5$ into a frame signal $P_6$, and separating the frame signal P6 into a PCM signal $P_7$ and a second control signal;

(Step 114 is performed by the demodulation module 28. However, the second control signal is not necessarily the same as the first control signal.)

Step 116: Determining if the bit error rate of the frame signal $P_6$ is acceptable? If yes, go to Step 118, else go to Step 120;

(Step 116 is performed by the error detection controller 62.)

Step 118: Transforming the frame signal $P_6$ into an analog audio signal;

(Step 118 is performed by the frame synchronization controller 30 and the DAC 32. The execution of the step 118 indicates that the RF signal $P_4$ received in Step 112 is correct.)

Step 120: Transmitting the control signal $P_c$ into the air; and (Step 120 is performed by the control signal transmitter 60. The execution of the step 120 indicates that the RF signal $P_4$ received in Step 112 is wrong.)

Step 122: Receiving the control signal $P_c$ and switching the used channel to another one, and go to Step 110.

(Step 122 is performed by the control signal receiver 56 and the channel switch controller 58. The execution of the step 122 indicates that the RF signal $P_4$ received in step 112 is wrong.)

In the first embodiment of the present invention, the channel that is used by the RF transmitter 24 to transmit the RF signal P4 is different from that used by the control signal transmitter 60. For example, the transmitter 52 selects a channel of 2.4 GHz, which is one of the channels shown in FIG. 7, while the control signal transmitter 60 selects another channel of 433 MHz, so as to diminish the interference problem.

Furthermore, in the first embodiment, the transmitter 52 has to function in accordance with the receiver 54, and the receiver 54 therefore can receive non-interfered RF signal. In practice, the transmitter 52 will not actively control the RF transmitter 24 to switch the used channel to another one without receiving the control signal Pc.

Furthermore, in the first embodiment, the digital audio signal $P_7$ generated by the frame synchronization controller 30 is then transformed into the analog audio signal by a digital-to analog process performed by the DAC 32 so that the speaker 34 can output the analog audio signals. However, the DAC 32 of the first embodiment can be omitted, and the speaker 34 can be replaced with a digital audio speaker, which plays digital audio signals.

Figure 5:
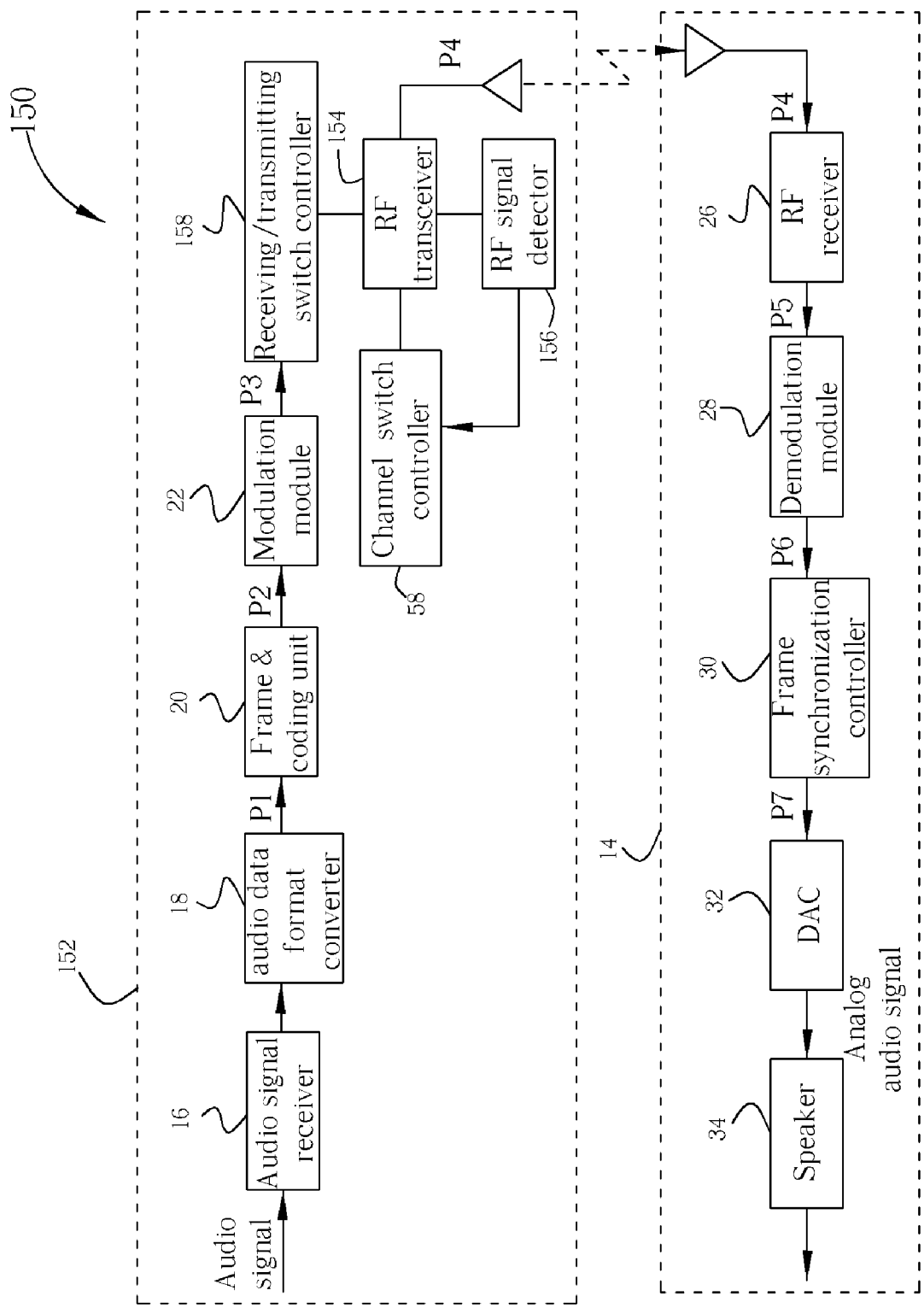
FIG. 5 is a functional block diagram of a wireless audio system of a second embodiment according to the present invention.

Please refer to FIG. 5, which is a functional block diagram of a wireless audio system 150 of a second embodiment according to the present invention. The wireless audio system 150 comprises a transceiver 152, and the receiver 14. In addition to the audio signal receiver 16, the audio data format converter 18, the frame & coding unit 20, the modulation module 22, and the channel switch controller 58, the transceiver 152 further comprises a receiving/transmitting switch controller 158 electrically connected to the modulation module 22, an RF transceiver 154 electrically connected between the receiving/transmitting switch controller 158 and the channel switch controller 58, and an RF signal detector 156 electrically connected between the RF transceiver 154 and the channel switch controller 58. Wherein the transceiver 152 can transmit and receive the RF signals in the air and detect the frequency of the channel used by the transceiver 152. Besides, the used channel will be switched to another one as long as the transceiver 152 detects another RF signal, the channel of which overlaps that being used previously.

The control of receiving/transmitting mode of the RF transceiver 154 is controlled by the receiving/transmitting switch controller 158. For example, when the receiving/transmitting switch controller 158 controls the RF transceiver 154 to operate in the transmitting mode, the base-band signal $P_3$ modulated by the modulation module 22 can be transferred through the receiving/transmitting switch controller 158 to the RF transceiver 154, and the RF transceiver 154 accordingly up-converts the base-band signal $P_3$ into the RF signal $P_4$ and wirelessly transmits the RF signal $P_4$ into the air. On the contrary, when the receiving/transmitting switch controller 158 controls the RF transceiver 154 to operate in the receiving mode, the base-band signal $P_3$ generated by the modulation module 22 cannot arrive the RF transceiver 154, and the RF transceiver 154 can receive nothing but the RF signals in the air accordingly.

More specifically speaking, the RF transceiver 154 is operated in the receiving mode, the RF signal detector 156 will generate a switch signal Ps when the RF transceiver 154 receives a RF signal, the power of which is strong enough to interfere the RF signal transmitted by the RF transceiver 154 previously. Similarly, after receiving the switch signal $P_s$, the channel switch controller 58 controls the RF transceiver 154 to switch the used channel to another one and then transmit the RF signal $P_4$ into the air.

Note that in the second embodiment of the present invention, the transmission data rate of the transceiver 152 is higher than that for transmitting the audio signal transmitted by the transceiver 152. For example, if the data rate of a CD or DVD player is 1.5–2 Mbps (Mega bit per sec.), the data rate of the transceiver 152 is higher than 2 Mbps, for example 5 Mbps. Thus, when the receiving/transmitting switch controller 158 is operated in the receiving mode, the working time is sufficient enough for the channel switch controller 58 to detect the RF signal received by the RF transceiver 154 and generate the switch signal Ps when the RF transceiver 154 receives a RF signal, the power of which is strong enough to interfere that of the RF signal transmitted by the RF transceiver 154.

Moreover, the RF signal detector 156 determines if two channels are overlapped by detecting whether the average power of the RF signal received by the RF transceiver 154 is stronger than a predetermined power. If yes, it is implied that the channel that the transceiver 154 used to transmit the RF signal P4 is overlapped by that used by another electronic device emits. Therefore, in order to diminish the inference problem, the channel switch controller 58 controls the RF transceiver 154 to switch the used channel to another one after receiving the switch signal $P_s$ generated by the RF signal detector 156.

Further, similar to the wireless audio system 50 of the first embodiment, the DAC 32 of the receiver 14 can be omitted, and the speaker 34 can be replaced with a speaker capable of playing digital audio signals.

Figure 6:
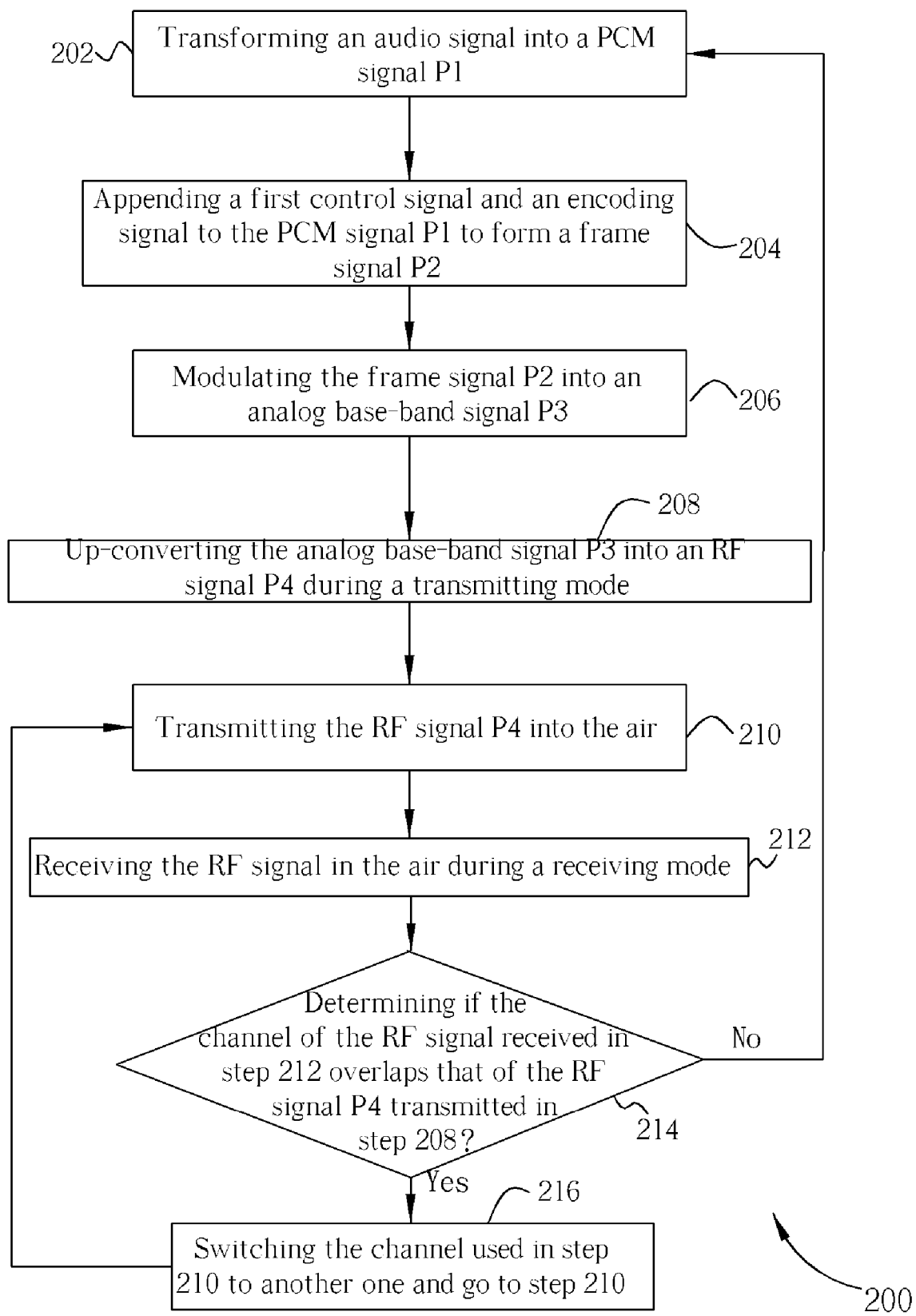
FIG. 6 is an interference-resistant method corresponding to the wireless audio system shown in FIG. 5.

Please refer to FIG. 6, which is a flow chart of an interference-resistant method 200 corresponding to the second embodiment of the present invention. The method 200 comprises the following steps:

Step 202: Transforming an audio signal into a PCM signal $P_1$;

Step 204: Appending a first control signal and an encoding signal (such as CRC) to the PCM signal $P_1$ to form a frame signal $P_2$;

Step 206: Modulating the frame signal $P_2$ into an analog base-band signal $P_3$;

Step 208: Up-converting the analog base-band signal $P_3$ into an RF signal $P_4$ during a transmitting mode;

(Step 208 is performed by the RF transceiver 154.)

Step 210: Transmitting the RF signal $P_4$ into the air;

Step 212: Receiving the RF signal in the air during a receiving mode;

(Step 212 is performed by the receiving/transmitting switch controller 158 and the RF transceiver 154.)

Step 214: Determining if the channel of the RF signal received in step 212 overlaps that of the RF signal $P_4$ transmitted in step 208? If yes, go to Step 216, else go to Step 202; and (Step 214 is performed by the RF signal detector 156.)

Step 216: Switching the channel used in step 210 to another one, and go to step 210.

In the first embodiment of the present invention, the control signal receiver 56 will transmit a control signal Pc into the air when the bit errors detected by the error detection controller 62 exceed a predetermined numbers in a period of time. After receiving the control signal $P_c$, the transmitter 52 switches the channel to another one. Therefore, the user doesn't have to suffer unendurable noises and switch the channel manually because the transmitter 52 accomplishes automatically. In the second embodiment of the present invention, the transceiver 152 can transmit and receive the RF signals in the air and detect the frequency of the channel used by the transceiver 152. Besides, the used channel will be switched to another one as long as the transceiver 152 detects another RF signal, the channel of which overlaps that being used previously. Thus, the interference problem can be diminished.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An interference-resistant method for a wireless audio system capable of transforming an audio signal into an RF signal, comprising:
    transforming the audio signal into a PCM signal;
    appending a first control signal to the PCM signal;
    modulating the PCM signal with the first control signal into an analog base-band signal;
    up-converting the analog base-band signal into the RF signal and transmitting the RF signal into the air in a transmitting mode;
    receiving the RF signal in the air during a receiving mode; and
    switching the channel used in the transmitted mode to another one when that used in the transmitting mode is overlapped by that used in the receiving mode.

2. An interference-resistant wireless audio system comprising:
    a transceiver for transforming an audio signal into an RF signal, the transceiver comprising:
        an audio signal receiver for receiving an audio signal;
        an audio data format converter electrically connected to the audio signal receiver for transforming the audio signal into a digital signal formatted for PCM;
        a frame & coding unit electrically connected to the audio data format converter for appending an encoding data to the digital signal;
        a modulation module electrically connected to the frame & coding unit for transforming the digital signal with the encoding data into an analog base-band signal;
        an RF transceiver for up-converting the analog base-band signal into the RF signal and transmitting the RF signal into the air when operating in a transmitting mode, and for receiving the RF signal in the air when operating in a receiving mode;
        a receiving/transmitting switch controller electrically connected between the modulation module and the RF transceiver, for controlling the RF transceiver to operate in the transmitting mode or in the receiving mode;
        an RF signal detector electrically connected to the RF transceiver for detecting the power of the RF signal received by the RF transceiver and for generating a switch signal when the power of the RF signal is stronger than a predetermined power in the receiving mode; and
        a channel switch controller electrically connected to the RF signal detector for controlling the RF transceiver to switch the used channel to another one after receiving the switch signal; and
    a receiver for receiving the RF signal in the air.

3. The interference-resistant wireless audio system of claim 2, wherein the analog base-band signal generated by the modulation module can be transmitted to the RF transceiver through the receiving/transmitting switch controller when the RF transceiver is operated in the transmitting mode.

4. The interference-resistant wireless audio system of claim 2, wherein the analog base-band signal generated by the modulation module cannot be transmitted to the RF transceiver, and the RF transceiver can receive the RF signal in the air when the RF transceiver is operated in the receiving mode.

5. The interference-resistant wireless audio system of claim 2, wherein the transmission data rate of the transceiver is higher than that of the audio signal.

6. The interference-resistant wireless audio system of claim 2, wherein the RF signal transmitted by the transceiver obeys WLAN 802.11a/b/g standards.

7. The interference-resistant wireless audio system of claim 6, wherein the carrier band switch controller when operating in the receiving mode can still control the RF transceiver to switch between a plurality of carrier band.

8. The interference-resistant wireless audio system of claim 2, wherein the receiver comprises an RF receiver for receiving the RF signal in the air, and for down-converting the received RF signal into a base-band signal.

9. The interference-resistant wireless audio system of claim 8, wherein the receiver further comprises a demodulation module electrically connected to the RF receiver for demodulating the base-band signal into a bit-streamed frame signal.

10. The interference-resistant wireless audio system of claim 9, wherein the receiver further comprises a frame synchronization controller electrically connected to the demodulation module for parsing the encoding data, and determining a digital audio signal.

11. The interference-resistant wireless audio system of claim 10, wherein the specific encoding data comprises a preamble, a header, and a data serving as an error protection code.

12. The interference-resistant wireless audio system of claim 4 further comprising a DAC electrically connected to the frame synchronization controller for transforming the digital audio signal into an analog audio signal.

13. The interference-resistant wireless audio system of claim 12 further comprising a speaker electrically connected to the DAC for playing the analog audio signal transformed by the DAC.

14. An interference-resistant method for a wireless audio system capable of transforming an audio signal into an RF signal, the method comprising:
transforming the audio signal into a PCM signal;
appending a first control signal to the PCM signal;
modulating the PCM signal with the first control signal into an analog base-band signal;
up-converting the analog base-band signal into the RF signal;
transmitting the RF signal into the air;
receiving the RF signal in the air;
detecting bit errors in the RF signal, and transmitting a control signal when the bit errors exceed a predetermined numbers; and
switching the channel to another one after receiving the control signal.

15. An interference-resistant wireless audio system comprising:
a transmitter for transforming an audio signal into an RF signal, the transmitter comprising:
an audio signal receiver for receiving an audio signal;
an audio data format converter electrically connected to the audio signal receiver for transforming the audio signal into a digital signal formatted for the pulse-code modulation (PCM);
a frame & coding unit electrically connected to the audio data format converter for appending an encoding data to the digital signal;
a modulation module electrically connected to the frame & coding unit for transforming the digital signal with the encoding data into an analog base-band signal;
an RF transmitter electrically connected to the modulation module for up-converting the analog base-band signal into the RF signal, and transmitting the RF signal into the air;
a control signal receiver for receiving a control signal in the air; and
a channel switch controller electrically connected to the RF transmitter and to the control signal receiver for controlling the RF transmitter to switch the used channel to another one when the control signal is received by the control signal receiver; and
a receiver comprising:
an RF receiver for receiving the RF signal, and for down-converting the received RF signal into a base-band signal;
a demodulation module electrically connected to the RF receiver for demodulating the base-band signal into a bit-streamed frame signal;
an error detection controller electrically connected to the demodulation module for detecting bit errors in the frame signal; and
a control signal transmitter electrically connected to the error detection controller for transmitting the control signal into the air when the detected bit errors of the frame signal are not acceptable.

16. The interference-resistance wireless audio system of claim 15, wherein the receiver further comprises a frame synchronization controller electrically connected to the demodulation module and the error detection controller for parsing the encoding data, and determining the audio signal.

17. The interference-resistant wireless audio system of claim 16, wherein the encoding data comprises a preamble, a header, and an error protection code.

18. The interference-resistant wireless audio system of claim 16 further comprising a digital-to-analog converter (DAC) electrically connected to the frame synchronization controller for transforming the digital audio signal into an analog audio signal.

19. The interference-resistant wireless audio system of claim 18 further comprising a speaker electrically connected to the DAC for playing the analog audio signal transformed by the DAC.

20. The interference-resistant wireless audio system of claim 1, wherein the RF signal transmitted by the transmitter obeys WLAN 802.11a/b/g standards.

21. The interference-resistant wireless audio system of claim 20, wherein the channel frequency of the control signal transmitted by the receiver is 433 MHz.

22. The interference-resistant wireless audio system of claim 1, wherein the format of the audio signal is analog, Inter-IC Sound (I2S), universal serial bus (USB), or Sony/Philips Digital Interface (SPDIF).

* * * * *